United States Patent [19]

Croft et al.

[11] Patent Number: 5,151,130
[45] Date of Patent: Sep. 29, 1992

[54] AMINE-BASED CONSISTENCY REDUCERS FOR GYPSUM STUCCO SLURRIES

[75] Inventors: Alan P. Croft, Lake Jackson; Brian D. Koblinski, Missouri City, both of Tex.

[73] Assignee: The Dow Chemical Company, Midland, Mich.

[21] Appl. No.: 644,727

[22] Filed: Jan. 23, 1991

[51] Int. Cl.$^5$ .............................................. C04B 11/00
[52] U.S. Cl. ................................... 106/778; 106/772; 106/802; 106/823; 106/819; 501/141; 524/446; 524/447; 156/39; 156/42; 156/44; 156/46
[58] Field of Search .............. 106/772, 775, 778, 802, 106/819, 823, 827; 501/141; 524/446, 447; 156/39, 40, 42, 43, 44, 46

[56]   References Cited
U.S. PATENT DOCUMENTS

| | | | |
|---|---|---|---|
| 2,152,670 | 4/1939 | Shutt et al. | 106/34 |
| 2,320,010 | 5/1943 | Ralston et al. | 106/90 |
| 3,072,494 | 1/1963 | Sherr et al. | 106/111 |
| 3,304,189 | 2/1967 | Kuntze et al. | 106/111 |
| 4,237,260 | 12/1980 | Lange et al. | 528/230 |
| 4,371,399 | 2/1983 | May et al. | 106/109 |
| 4,681,644 | 7/1987 | Dozsa | 156/39 |
| 5,034,448 | 7/1991 | Koblinski | 524/447 |

OTHER PUBLICATIONS

JA-7307685-R (Abstract only: Derwent 73-142284) Lion Fat and Oil Co., Ltd, Gypsum Board of Reduced Water Absorption by Treatment with a Water Soluble Primary Alkylamine Salt.
Chemical Abstract 106:181604a Ratinov et al., *Dokl. Akad. Navk SSSR*, 1987, 292(5), 1196-8.

Primary Examiner—Mark L. Bell
Assistant Examiner—Michael A. Marcheschi

[57] ABSTRACT

A method for reducing the consistency of a water and gypsum stucco slurry comprising admixing water, stucco, and an additive, the additive in an amount effective to reduce the consistency of the admixed slurry as compared to a slurry containing only water and stucco, and the additive selected from the group consisting of one or more polyalkylene polyamines having a molecular weight below 1,000.

19 Claims, No Drawings

AMINE-BASED CONSISTENCY REDUCERS FOR GYPSUM STUCCO SLURRIES

BACKGROUND OF THE INVENTION

This invention pertains to a method of reducing the consistency of a stucco slurry.

Gypsum wallboard is a large volume product in the United States where it is used for interior walls in most new construction. Low cost, wide availability, the safety its fire retarding nature imparts to the finished structure, and ease of use contribute to its popularity.

For a brief explanation of the uses, properties, and production methods of gypsum and stucco, Volume 4 of Kirk-Othmer's "Encyclopedia of Chemical Technology" (1978 ed.) at pages 437–448 may be consulted.

The production of gypsum wallboard is uncomplicated. Various commercial methods of producing gypsum board are well-known in the art. Gypsum, the dihydrate of calcium sulfate, is mined, ground, and calcined to give the hemihydrate known commonly as stucco or plaster of Paris. In a mixer, stucco, water, and additives are combined to form a stucco slurry. The stucco slurry is fed between two continuous sheets of paper to form a board on a conveyor. While the board moves down the conveyor, the stucco sets to reform gypsum, the dihydrate.

A workable stucco slurry requires more water than is needed to reform the dihydrate. After setting, the excess water must be driven off to produce the finished wallboard. Typically, drying kilns are used to remove the excess water. Since drying kilns are energy intensive, a major cost in wallboard production would be lessened if the amount of excess water in the stucco slurries was reduced.

Currently, lignosulfonates and napthalene sulfonates are used as consistency reducers to minimize the amount of water needed in a stucco slurry. However, the sulfonates' tendency to significantly retard set time limits their level of use.

Therefore, it would be advantageous to the gypsum wallboard industry to possess additives which reduce a stucco slurry's consistency without significantly retarding set time. The gypsum wallboard industry would benefit from such additives because the additive would reduce the energy costs spent to drive off the excess water in drying kilns and thereby produce the finished wallboard. And moreover, it would be beneficial if the additive would do so without significantly retarding set time.

SUMMARY OF THE INVENTION

In one respect, the present invention is a method for reducing the consistency of a water and stucco slurry comprising admixing water, stucco, and an additive, the additive in an amount effective to reduce the consistency of the admixed slurry as compared to a slurry containing only water and stucco, and the additive selected from the group consisting of one or more polyalkylene polyamines having a molecular weight below 1,000.

In another respect, the present invention is an improved method of making gypsum wallboard wherein (1) water and stucco are admixed to produce a slurry, (2) the slurry is deposited between two barriers to produce a board, and (3) the board is heated after the slurry begins to set, the improvement which comprises admixing an additive with the water and stucco in step (1), the additive in an amount effective to reduce the consistency of the admixed slurry as compared to a slurry containing only water and stucco, and the additive selected from the group consisting of one or more polyalkylene polyamines having a molecular weight below 1,000.

Advantageously, the treated stucco slurries of the present invention show reduced consistency when compared to untreated stucco slurries. Consequently, the amount of water needed to form a workable stucco slurry is reduced in the present invention.

DETAILED DESCRIPTION OF ILLUSTRATIVE EMBODIMENTS

The polyalkylene polyamines which can be employed in this invention include straight-chain, branched, and cyclic compounds which have two or more carbon atoms and one or more nitrogen atoms, and which have an average molecular weight of less than about 1,000, more preferably less than about 800. Examples of suitable polyalkylene polyamines include ethylenediamine, diethylenetriamine, triethylenetetramine, tetraethylenepentamine, pentaethylenehexamine, hexaethyleneheptamine, aminoethylpiperazine, propylenediamine, butylenediamine, pentamethylenediamine, hexamethylenediamine, diethylenetriamine, dipropylenetriamine, dibutylenetriamine, bis(pentamethylene)triamine, bis(hexamethylene)tetramine, tetrapropylenepentamine, tetrabutylenepentamine, tetrakis(pentamethylene)pentamine, tetrakis(hexamethylene)pentamine, pentapropylenehexamine, pentabutylenehexamine, pentakis(pentamethylene)hexamine, pentakis(hexamethylene)hexamine, bis(aminopropyl)ethylenediamine, bis(aminopropyl)diethylenetriamine, tris(aminopropyl)ethylenediamine, Ethyleneamine E-100, piperazine and the like. Ethyleneamine E-100 is a blend of polyethylene polyamine isomers having similar boiling points around 240° C. to 260° C. at atmospheric pressure and average molecular weights of about 250 to about 300. Ethyleneamine E-100 is produced and sold by The Dow Chemical Company under the same name. Likewise, triethylenetetramine and tetraethylenepentamine are generally available commercially only as a mixture of isomers having similar boiling points. Examples of preferred polyalkylene polyamines include ethylenediamine, diethylenetriamine, triethylenetetramine, tetraethylenepentamine, Ethyleneamine E-100, piperazine, and mixtures thereof.

A mixture containing a varying percentage of piperazine is useful in this invention. An example of such a mixture containing piperazine, polyamines, ethanolamine, and water is used in the Examples. The piperazine-amine mixture is comprised of 40–50% piperazine, 5–10% ethylenediamine, 5–10% ethanolamine, 1–5% triethylenediamine, 2–10% diethylenetriamine, and 30–40% water with the sum of the percentages totaling 100.

The amount of additive employed in this invention is any amount effective to reduce the consistency of a slurry composed of only water and gypsum stucco. Preferably, the amount of additive is between 0.01 ppm and 10,000 ppm. "Ppm" is defined herein as the parts of additive by weight per million parts by weight of treated slurry containing additive, stucco, and water. More preferably, the amount of additive is between 750 ppm and 6,000 ppm.

Additives employed in the present invention are meant to replace the lignosulfonates currently used to reduce consistency in stucco slurries. Because lignosulfonates greatly increase set time, their levels of use in the slurries is limited. In a preferred embodiment, the additives of the present invention are essentially free of lignosulfonates.

In this invention, it is preferred to used additives essentially free of acid. "Essentially free of acid" as defined herein means essentially free of acids which can be used to neutralize the additive and of acids chemically bonded to the additives.

The stucco which can be employed in this invention includes all grades derived from gypsum by conventional industrial methods and generally used in the wallboard industry. Typically, gypsum, which may be derived from mining processes or produced synthetically, is calcined to produce stucco, the hemihydrate of calcium sulphate.

In this invention, the order of adding the components of a stucco slurry is not critical. If the additive is admixed with a preformed water and gypsum stucco slurry, it is preferred that the additive be admixed with the slurry prior to the slurry setting up. Additionally, the additive may be admixed with water prior to the addition of the water to the stucco. Finally, the water, stucco, and additive may be admixed at about the same time. Likewise, the method and machines used to admix the components of the slurry are not critical. Any method of admixing will work so long as the additive is dispersed throughout the admixed slurry such that the consistency of the slurry is reduced.

The amount of water used in this invention when a stucco slurry is formed in any amount sufficient to reform gypsum, the dihydrate of calcium sulphate, after the stucco slurry sets up. Typically, the amount of water used to form a workable stucco slurry is greater than the amount needed to reform the dihydrate. It is an object of this invention to decrease the amount of water needed to make a workable stucco slurry such as may be used in the production of gypsum wallboard.

Gypsum wallboard, accordingly, can be made using the additive of the invention. In commercial methods of producing wallboard, which are well-known in the art, water and stucco are combined in a mixer to form a slurry. Next, the slurry is fed between two barriers such as paper sheets to form a board on a conveyor. While the board moves down the conveyor, the stucco sets and rehydrates to form gypsum. Finally, the board is cut into sections and kiln dried. In an improved process, the additive of the instant invention can be added during the step of forming the slurry to reduce the consistency of the slurry and thereby decrease the amount of water needed to form a workable slurry. Consequently, the addition of the additive reduces the energy consumed to kiln dry the cut sections because the amount of excess water needed to be driven off is lessened.

Various well-known additives can be added to the slurry to aid in setting. For example, ground gypsum, potassium sulfate, or ammonium sulfate are commonly employed to accelerate the set rate. Conversely, starch or glue may be added to retard set. In addition, structural elements such as fibers or ground paper can also be incorporated to alter the strength of the board.

SPECIFIC EMBODIMENTS OF THE INVENTION

The following examples are given to illustrate the invention and should not be construed as limiting its scope. All parts and percentages are by weight unless otherwise indicated.

SLURRY PREPARATION PROCEDURE

Into the stainless steel mixing container of a malt mixer is placed 200–275 grams deionized water and an amount of test additive solution corresponding to the final additive concentration in the finished slurry as given in the Example. The amount of water is determined by repeated runs without any test additives until a patty 7.0±0.1 inches is obtained using the Johnson Cup Test described later. The amount of water found to produce 7.0±0.1 inch patties is then used for the control and all test runs for the day. The water and additive solution are stirred briefly. Over a 20-second period, 200 grams of stucco is added to the vessel. Timing is begun at the moment the first gypsum stucco powder is added to the water. The stucco is allowed to soak for the remainder of the first minute. At the end of the minute, the container is placed on a malt mixer and mixed at high speed for 30 seconds. Following mixing, the contents of the container is poured into a clean 250 ml beaker to eliminate bubbles. If the stucco appears lumpy when poured into the beaker, it is discarded and the procedure repeated. The prepared stucco slurry is used in the test below.

JOHNSON CUP TEST

The apparatus for this test consists of a Johnson cup, an open-topped cylindrical cup with a hole in the bottom, which is suspended 2.5 inches above a smooth level glass plate that has been sprayed lightly with a silicone mold release. The cup has the following dimensions: internal height 4.0 inches, internal diameter 2.0 inches, and hole diameter 5/16 inch. The prepared stucco slurry is poured into the cup while keeping a finger over the exit hole. When the cup is filled completely and leveled, the finger is removed and a patty is allowed to form on the glass surface. The diameter of the circular patty is determined and recorded. The test is repeated and the results averaged for greater precision. The resulting data is given in the Example. If the patty diameter at a given additive level is larger than the diameter when no additive is used, the additive has reduced the consistency of the stucco slurry.

EXAMPLE 1

Results of Johnson Cup Test for Varying Levels of Test Additives (Patty Diameters Given in Inches)

TABLE I

| Additive | Additive level (ppm) | | | | | | |
|---|---|---|---|---|---|---|---|
| | 0[6] | 750 | 1000 | 1500 | 3000 | 4000 | 6000 |
| EDA[1] | 6.90 | 7.15 | 7.20 | 7.45 | 7.20 | 7.35 | 7.55 |
| DETA[2] | 6.90 | 7.25 | 7.25 | 7.25 | 7.55 | 7.50 | 7.60 |
| TETA[3] | 7.10 | 7.65 | 7.70 | 7.60 | 7.65 | 7.75 | 7.85 |
| TEPA[4] | 7.10 | 7.30 | 7.35 | 7.40 | 7.45 | 7.60 | 7.70 |
| Ethyleneamine E-100 | 7.00 | 7.30 | 7.35 | 7.40 | 7.45 | 7.60 | 7.70 |
| Piperazine | 7.10 | 7.20 | 7.35 | 7.50 | 7.50 | 7.45 | 7.75 |
| Piperazine- | 7.10 | 7.45 | 7.55 | 7.45 | 7.50 | 7.60 | 7.90 |

TABLE I-continued

| Additive | Additive level (ppm) | | | | | | |
|---|---|---|---|---|---|---|---|
| | 0[6] | 750 | 1000 | 1500 | 3000 | 4000 | 6000 |
| Amine Mix[5] | | | | | | | |

[1] Ethylenediamine
[2] Diethylenetriamine
[3] Triethylenetetramine
[4] Tetraethylenepentamine
[5] Piperazine-Amine Mix is a mixture containing 40–50% piperazine, 5–10% ethylenediamine, 5–10% ethanolamine, 1–5% triethylenediamine, 2–10% diethylenetriamine, and 30–40% water.
[6] Not an embodiment of the invention.

In Table I, the same batch of slurry is used to prepare all the samples from 0 ppm to 6,000 ppm for each additive. The prepared samples are used the same day because the data at the 0 ppm additive level varies depending on humidity, temperature, etc. on each particular day. Thus, the data at the 0 ppm level will vary from day to day despite the admixing of precisely the same ingredients in the same amounts.

Based upon these observations, it can be concluded that the addition of small amounts of cyclic, branched, and straight-chain polyalkylene polyamines to stucco slurries reduces the consistency of the admixture.

What is claimed is:

1. A method for reducing the consistency of a water and stucco slurry comprising admixing water, stucco, and an additive, the additive in an amount effective to reduce the consistency of the admixed slurry as compared to a slurry containing only water and stucco, and the additive comprising one or more polyalkylene polyamines having a molecular weight below 1,000.

2. The method of claim 1 wherein the amount is between about 0.01 ppm and about 10,000 ppm.

3. The method of claim 1 wherein the amount of additive is between about 750 ppm and about 6,000 ppm.

4. The method of claim 1 wherein the additive is selected from the group consisting of ethylene-diamine, diethylenetriamine, triethylenetetramine, tetraethylenepentamine, piperazine, and mixtures thereof.

5. The method of claim 4 wherein the amount is between about 0.01 ppm and about 10,000 ppm.

6. The method of claim 4 wherein the amount is between about 750 ppm and about 6,000 ppm.

7. The method of claim 1 wherein the additive comprises piperazine.

8. The method of claim 7 wherein the amount of additive is between about 0.01 ppm and about 10,000 ppm.

9. The method of claim 7 wherein the amount of additive is between about 750 ppm and about 6,000 ppm.

10. In a method of making gypsum wallboard wherein (1) water and stucco are admixed to produce a slurry, (2) the slurry is deposited between two barriers to produce a board, and (3) the board is heated after the slurry begins to set, the improvement which comprises admixing an additive with the water and stucco in step (1), the additive in an amount effective to reduce the consistency of the admixed slurry as compared to a slurry containing only water and stucco, and the additive comprising one or more polyalkylene polyamines having a molecular weight below 1,000.

11. The method of claim 10 wherein the amount is between about 0.01 ppm and about 10,000 ppm.

12. The method of claim 10 wherein the amount of additive is between about 750 ppm and about 6,000 ppm.

13. The method of claim 10 wherein the additive is selected from the group consisting of ethylenediamine, diethylenetriamine, triethylenetetramine, tetraethylenepentamine, piperazine, and mixtures thereof.

14. The method of claim 13 wherein the amount is between about 0.01 ppm and about 10,000 ppm.

15. The method of claim 14 wherein the amount is between about 750 ppm and about 6,000 ppm.

16. The method of claim 10 wherein the additive comprises piperazine.

17. The method of claim 16 wherein the amount of additive is between about 0.01 ppm and about 10,000 ppm.

18. The method of claim 16 wherein the amount of additive is between about 750 ppm and about 6,000 ppm.

19. A method for reducing the consistency of a water and stucco slurry comprising admixing water, stucco, and an additive, the additive in an amount between about 0.01 ppm and about 10,000 ppm, and the additive comprising piperazine, ethylenediamine, ethanolamine, triethylenediamine, and diethylenetriamine.

* * * * *